United States Patent [19]
Persinski et al.

[11] 3,928,196
[45] Dec. 23, 1975

[54] INHIBITION OF SCALE DEPOSITION

[75] Inventors: Leonard John Persinski; Paul Hotchkiss Ralston, both of Pittsburgh; Robert Cornelius Gordon, Jr., Rochester, all of Pa.

[73] Assignee: Calgon Corporation, Pittsburgh, Pa.

[22] Filed: Dec. 5, 1973

[21] Appl. No.: 421,900

[52] U.S. Cl. ................................ 210/58; 252/180
[51] Int. Cl.² ........................................ C02B 5/06
[58] Field of Search............ 252/180, 181, DIG. 11; 210/58

[56] References Cited
UNITED STATES PATENTS
3,709,815   1/1973   Boothe et al. .................. 210/58

*Primary Examiner*—Thomas G. Wyse
*Attorney, Agent, or Firm*—Rudolph J. Anderson, Jr.; Harry E. Westlake; Martin L. Katz

[57] ABSTRACT

Method of inhibiting scale formation in aqueous systems in which copolymers of 2-acrylamido-2-methylpropyl sulfonic acid and acrylic acid are used.

2 Claims, No Drawings

INHIBITION OF SCALE DEPOSITION

BACKGROUND OF THE INVENTION

This invention relates to methods of inhibiting scale formation and/or the formation of scale-forming salts in aqueous solution comprising adding to said solution small amounts of a water-soluble copolymer of 2-acrylamido-2-methylpropyl sulfonic acid and acrylic acid.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, pressure or temperature, and the introduction of additional ions which form insoluble compounds with the ions already present in the solution.

As these reaction products precipitate on surfaces of the water carrying system, they form scale or deposits. This accumulation prevents effective heat transfer, interferes with fluid flow, facilitates corrosive processes, and harbors bacteria. This scale is an expensive problem in many industrial water systems, causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agent as cation, and these amounts are not always desirable or economical.

More than 25 years ago it was discovered that certain inorganic polyphosphates would prevent such precipitation when added in amounts far less than the concentrations needed for sequestering or chelating. By polyphosphates we mean phosphates having a molar ratio of metal oxide: $P_2O_5$ between 1:1 and 2:1.

When a precipitation inhibitor is present in a potentially scaleforming system at a markedly lower concentration than that required for sequestering the scale forming cation, it is said to be present in "threshold" amounts. See for example, Hatch and Rice, "Industrial Engineering Chemistry", Vol. 31, page 51 at 53 (Jan. 1939); Reitemeier and Buehrer, "Journal of Physical Chemistry", Vol. 44, No. 5, page 535 at 536 (May 1940); Fink and Richardson U.S. Pat. No. 2,358,222; and Hatch U.S. Pat. No. 2,539,305.

Generally, sequestering takes place at a weight ratio of threshold active compound to scale-forming cation components of greater than about ten to one, depending on the anion components in the water. Threshold inhibition generally takes place at a weight ratio of threshold active compound to scale-forming cation components of less than about 0.5 to 1.0.

Certain water soluble polymers including groups derived from acrylamide and acrylic acid have been used to condition water containing scale-forming compounds. As for example, see U.S. Pat. Nos. 2,783,200; 3,514,476; 2,980,610; 3,285,886; 3,463,730; and 3,518,204.

DESCRIPTION OF THE INVENTION

We have found that copolymers of 2-acrylamido-2-methylpropyl sulfonic acid and acrylic acid are effective in inhibiting scale formation and deposition in aqueous systems such as industrial waters. These copolymers may have a molecular weight of from about 1000 to 100,000 and may contain from about 5% to 75 mole % 2-acrylamido-2-methylpropyl sulfonic acid and from about 95 to 25 mole % acrylic acid. The preferred polymers, however, have a molecular weight in the range of from about 1000 to 10,000 and contain from about 5 to 50 mole % 2-acrylamido-2-methylpropyl sulfonic acid and from about 95 to 50 mole % acrylic acid.

We have performed experiments at several temperatures for various lengths of time to demonstrate the effectiveness of different concentrations and forms of these combinations in inhibiting the the precipitation of scale-forming salts. In these experiments, we mixed solutions of two soluble salts in the presence of the inhibitor composition to form a solution containing a relatively insoluble scale-forming salt at several times its equilibrium concentration.

As a control, each experiment was also conducted in the absence of a precipitation inhibitor.

By titrating a small amount of the solution and thereby determining the concentration of one of its soluble components, the amount of precipitate formed in a particular test solution at a particular time was calculated. We used the well-known Schwarzenbach titration and determined the concentration of the alkaline earth metal cation. At the end of the experiment, the concentration of soluble cation in each control solution, as determined by titration, was considered to be 0 percent inhibition. If no precipitate formed in an inhibited test solution and it therefore contained all of its original cation content, it was considered to be 100 percent inhibited. Titration results intermediate to the 0 percent and 100 percent inhibition values were directly related to these extremes and converted to percent inhibition.

For example, in the case of the scale-forming salt, calcium carbonate ($CaCO_3$), we added, with agitation, calcium chloride and sodium carbonate to a solution containing distilled water to form a solution at 4.2 times the equilibrium concentration. In the control experiment no inhibitor was present in the test solution. In other experiments, various amounts of a scale inhibitor were present prior to the addition of the scale forming solutions. At the end of the storage period, the control solution contained both soluble calcium and calcium precipitated as calcium carbonate. Titration of the soluble calcium in the control solution by the familiar Schwarzenbach method indicated the concentration of calcium carbonate in solution. This calcium carbonate concentration was the equilibrium concentration under the conditions of the test (pH, temperature, ionic strength, etc.).

When small concentrations of our scale inhibitor were present in the test described above, more calcium ion (and therefore more carbonate ion) remained in solution and less calcium carbonate precipitated at the end of the storage test. This greater concentration was confirmed by the titration of calcium in the solutions and related to the equilibrium concentration of the untreated control solution.

In the following tables, the inhibition of deposition of calcium sulfate and calcium carbonate is demonstrated under the conditions described. The temperature was held at 150° F. throughout.

Selected compositions were tested in supersaturated scale forming solutions and stored for 24 hours at 150° F. The degree of effectiveness was calculated by analyzing for the amount of alkaline earth metal ion remaining in the treated and untreated samples after storage. 100 percent inhibition indicates that all of the scale forming metal ion remains in solution after storage.

TABLE I

Test for CaSO$_4$ Stabilization
2.3 Times Equilibrium Solubility

| 25% 2-AMPSA:75% Acrylic Acid (Mole%) | Percent Inhibition |
|---|---|
| 0 mg/l | 0 |
| 5 mg/l | 36 |
| 10 mg/l | 64 |
| 15 mg/l | 79 |
| 18 mg/l | 91 |
| 20 mg/l | 100 |
| 75% 2-AMPSA:25% Acrylic Acid (Mole%) | Percent Inhibition |

TABLE I-continued

Test for CaSO$_4$ Stabilization
2.3 Times Equilibrium Solubility

| 20 mg/l | 10 |
|---|---|

TABLE II

Test for CaCO$_3$ Stabilization at
4.2 Times Equilibrium Solubility

| 25% 2-AMPSA:75% Acrylic Acid (Mole %) | Percent Inhibition |
|---|---|
| 0 mg/l | 0 |
| 10 mg/l | 67 |
| 15 mg/l | 82 |
| 18 mg/l | 90 |
| 20 mg/l | 90 |
| 75% 2-AMPSA:25% Acrylic Acid (Mole %) | Percent Inhibition |
| 10 mg/l | 5 |

We claim:
1. A method of inhibiting the precipitation of scale forming salts in an aqueous system comprising adding from 1 to 100 ppm of a copolymer having a molecular weight in the range of from about 1,000 to about 10,000 wherein said copolymer contains from about 5 to about 75 mole % of 2-acrylamido-2-methylpropyl sulfonic acid and from about 95 to about 25 mole % of acrylic acid.

2. A method as in claim 1 wherein the copolymer is a copolymer of about 25 mole % 2-acrylamido-2-methylpropyl sulfonic acid and about 75 mole % acrylic acid.

* * * * *